(No Model.)
E. W. RICE, Jr. & A. L. ROHRER.
SYSTEM OF ELECTRICAL DISTRIBUTION.
No. 396,603. Patented Jan. 22, 1889.
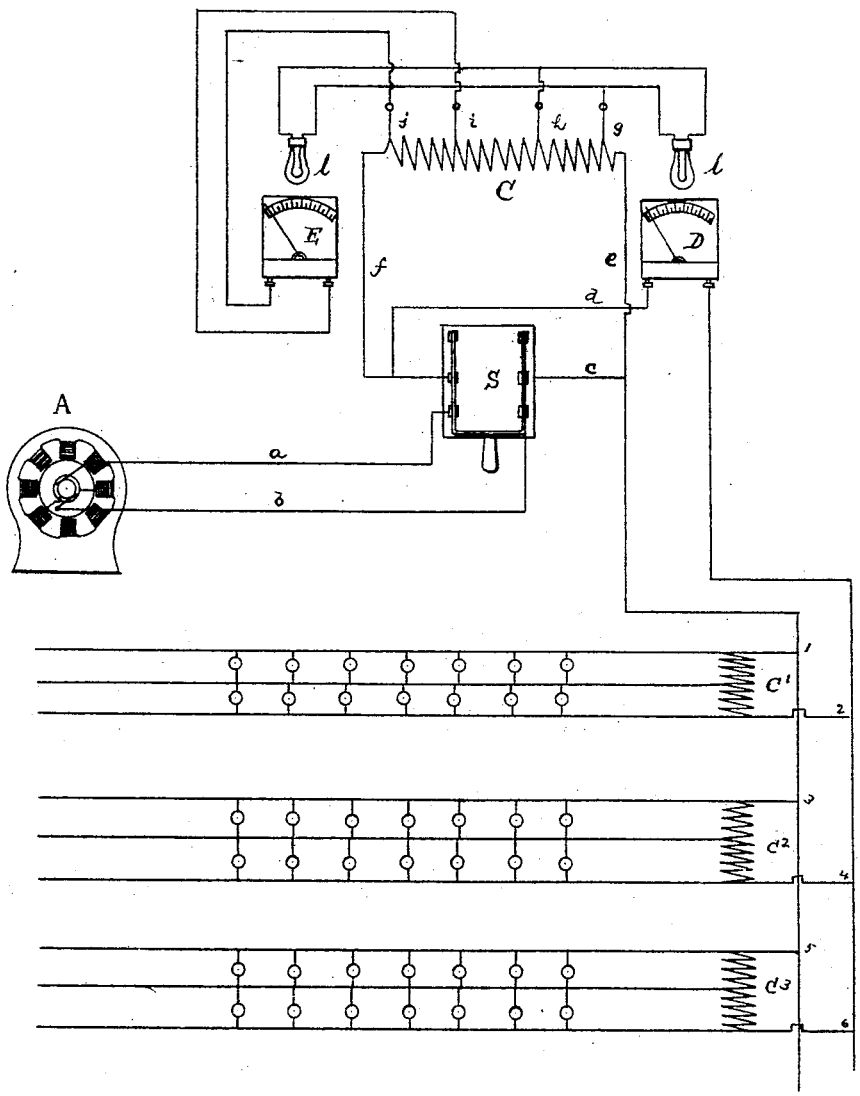
WITNESSES:
Ira R. Steward.
Wm. H. Capel
INVENTOR
E. Wilbur Rice, Jr.
Albert L. Rohrer,
By Townsend & MacArthur
ATTORNEYS.

UNITED STATES PATENT OFFICE.

E. WILBUR RICE, JR., AND ALBERT L. ROHRER, OF LYNN, MASSACHUSETTS.

SYSTEM OF ELECTRICAL DISTRIBUTION.

SPECIFICATION forming part of Letters Patent No. 396,603, dated January 22, 1889.

Application filed July 26, 1888. Serial No. 281,120. (No model.)

*To all whom it may concern:*

Be it known that we, E. WILBUR RICE, Jr., and ALBERT L. ROHRER, citizens of the United States, and residents of Lynn, in the county of Essex and State of Massachusetts, have invented a certain new and useful System of Electrical Distribution, of which the following is a specification.

Our invention relates to arrangements of apparatus at the supply-station of an alternating-current system of distribution, and is designed more especially for use in those systems wherein potential-equalizers consisting of induction transfer-coils, applied after the manner forming the subject of Patent No. 360,125 to Elihu Thomson, are used.

Our invention consists in the special arrangements and combinations more particularly hereinafter described, and then specified in the claims.

In the accompanying drawing, we have illustrated diagrammatically an arrangement of apparatus embodying our invention.

A indicates a source of alternating current of any desired character—such, for instance, as a dynamo-electric machine; and $a\ b$ mains leading from said dynamo to a double-pole switch, S, adapted to break the connection of both mains $a\ b$. From the switch S, which is located at the station, run the distributing-mains $c\ d$, to which connect, as indicated at $C'\ C^2\ C^3$, induction transfer-coils or equalizers, such as described in the patent before referred to. These potential-equalizers are here indicated as in the form of reactive coils connected between the distributing-mains and having local mains or supply-wires connected to them at proper points, and in turn supplying the incandescent electric lamps or other translating devices.

From the switch S, and on the opposite side thereof from the dynamo, so as to form in effect a branch from the supply-mains $c\ d$, lead the wires $e\ f$, connected to a reactive or induction transfer-coil, C, of the character described in the patent referred to. Connections $h\ g$ lead to suitable pilot-lamps, $l\ l$, while other connections, $i\ j$, lead to a potential-indicator, E. The coil C and the indicating-appliances, consisting of the lamps $l$ and potential-indicator E, like switch S, form a part of the station apparatus. A current-indicator, D, is also placed at the station in convenient proximity to the dynamo, and is included in a distributing-main, $c\ d$, on the side of the switch opposite the dynamo.

The devices described forming the station apparatus are used in obvious and well-known manner.

The switch S on being manipulated will break the connection of both poles of the dynamo, not only with the mains, but with the current-indicator and the potential or other indicators in the branch to the supply-mains.

What we claim as our invention is—

1. In a station apparatus for alternating-current systems of distribution, a double-pole switch placed between the generator and the mains, and a branch between the mains connected thereto at the opposite side of the double-pole switch from the generator, said branch containing potential-indicating appliances, all as shown, whereby on operation of the switch both the mains and the potential-indicator are severed from connection with the machine at both terminals.

2. In a station apparatus for an alternating-current system of distribution, a branch from the supply-mains, containing a reactive coil, and indicating appliances connected to said coil.

3. In station apparatus for an alternating-current system of distribution, mains $a\ b$, connecting the alternating source to a double-pole switch, connections from the switch to the supply-mains, a current-indicator in said connections, and a branch from the switch and supply-mains, including a reactive coil with which indicating devices are connected.

4. A station apparatus for alternating-current systems of distribution, comprising a reactive coil connected in a branch across the mains, and having two local circuits connected to it, one leading to pilot-lamps and the other to a potential-indicator, a current-indicator in the supply-main, and a double-pole switch between the dynamo and the converter, the current-indicator, and the supply-mains.

5. In a station apparatus for alternating-current systems of distribution, the reactive coil in a branch across the supply-mains, and two local circuits connected to said coil, one containing a potential-indicator, E, and the other pilot-lamps $l$.

6. In an alternating-current system of distribution, supply-mains $c\ d$, having compensating-converters connected in multiple between them and in turn connected with the local wires, of translating devices, and a station apparatus consisting of a double-pole switch in the connection from the dynamo to the supply-mains, a current-indicator in the mains, and a branch having a compensating-converter with which a potential-indicator and pilot-lamps are connected.

Signed at Lynn, in the county of Essex and State of Massachusetts, this 21st day of July, A. D. 1888.

E. WILBUR RICE, JR.
    ALBERT L. ROHRER.

Witnesses:
 J. W. GIBBONEY,
 M. E. HOLT.